Patented Nov. 8, 1938

2,136,241

UNITED STATES PATENT OFFICE 2,136,241

STORAGE BATTERY POSITIVE ELECTRODE AND METHOD OF MAKING THE SAME

Harold R. Harner, Frederick H. Schultz, and Everett J. Ritchie, Joplin, Mo., assignors to The Eagle-Picher Lead Company, Cincinnati, Ohio, a corporation of Ohio No Drawing. Original application September 30, 1935, Serial No. 42,878, now Patent No. 2,108,748, dated February 15, 1938. Divided and this application January 13, 1938, Serial No. 184,844

6 Claims. (Cl. 136—26)

Our invention relates to lead-acid storage batteries and more particularly to the positive plates or electrodes. By our invention we produce electrodes of far greater tenacity and consequently greater life than ordinary electrodes, and furthermore owing to the greater tenacity we may make electrodes of lower apparent density and therefore lower cost than can be produced by ordinary methods.

The common cause of failure of the positive plates or electrodes in service is due to the poor bond between the particles of lead peroxide composing the electrode. This bond is usually only residual lead sulfate and is not tenacious enough to prevent rapid disintegration of the electrode during use. The gassing at the end of charging loosens the lead peroxide particles and blows them into the electrolyte whence they settle into the sediment compartments of the cell and are useless to the further functioning of the battery. Heretofore to slow down this loss of positive electrode active material during the use of the cell, it has been customary to increase the apparent density of the active material by using a dense paste for filling the grid. Such a dense paste has several disadvantages of which we may name the high cost, the low yield due to the poor porosity, and a tendency to buckle in undercharge service due to the density of the material not allowing sufficient pore space or porosity to take up the volume increase as the active material changes from lead peroxide to lead sulfate on complete discharge. By our invention we eliminate all these undesirable features and provide a positive electrode of low apparent density and low cost with at the same time high porosity, little tendency to buckle and with markedly improved life characteristics.

In carrying out our invention we introduce phenol and formaldehyde into the active material or material to be made active and set or condense these chemicals by dipping the electrode into dilute acid. For example, we may take the unformed positive electrodes as they come from the drier after pasting, dip the electrodes in a water suspension or solution of phenol and formaldehyde for a few seconds, or until the air has been expelled from the electrode, then remove the electrode and dip it in dilute sulfuric acid for a few seconds and again dry the electrode. The above is by way of example only and we may depart from it widely in processing as needed by the particular electrode in question without departing from the spirit of the invention. We may, for example, prefer to dip the electrode in a water solution of phenol or any other well known solvent and set the bond by forming the electrode in an electrolyte of dilute sulfuric acid and formaldehyde. In either case a bonding network of phenol-formaldehyde condensation product is formed, mainly on the surface of the electrode but extending into the pores thereof and partially enclosing the already existing network of lead compounds present in the electrode. This network of phenol-formaldehyde condensation product is relatively stable in battery electrolyte and serves to extend the useful life very greatly, double the life from untreated plates having been shown on laboratory tests.

The bonding network of phenol-farmaldehyde condensation product set up in the electrode on treating is independent of the original composition of the electrode. The paste from which the electrode is made may contain as ingredients red lead, litharge, lead sulphate, lead suboxide, lead powder or mixtures thereof together with such fillers or addition agents as may have been incorporated. Once the paste has been filled into the grids and the resulting electrode dried there is produced a substantial structure of lead materials. Our bonding network is produced in the voids within and on the surface of this lead structure independently of the original character or composition of the paste ingredients.

By way of illustration we may prepare a positive plate by an admixture of red lead, litharge and lead powder to which is added dilute sulfuric acid to produce the desired paste density; this is pasted into the grid by any suitable means and may then be treated in our solution, or we may first dry the plate before treating. We prefer to use the dried plates wherein the lead network has been firmly established by proper drying. From the known density of the paste used it is a simple matter to calculate the volume of liquid required to fill the pores of the dry plate. We prefer to adjust our solution to such a strength that the volume of our solutions absorbed per plate will carry into the plate a predetermined amount of phenol and formaldehyde. For example, to treat plates carrying 150 grams of dry active material, and having a porosity of 15 cubic centimeters, to introduce 1% of phenol-formaldehyde bonding material in the plate, we so adjust our solutions that each 15 cubic centimeters contains 1.5 grams of phenol and formaldehyde combined. Inasmuch as phenol and formaldehyde set or condense in different ratios producing different products, we may desire to vary the ratio of one to the other in our solutions to produce the result desired in the case in question. For example we have used the phenol and formaldehyde in the ratios of their molar weights with good results. To make such a solution to the strength needed above we would add 60.5 grams of 88% phenol and 42.3 grams of 40% formaldehyde to each liter of water solution desired. As our second, or setting solution we use dilute sulfuric acid, 1.100 sp. gr. for example. Following this treatment we prefer to dry the plate thoroughly before the further step of forming the plate.

This application is a division of our co-pending application Serial No. 42,878 filed September 30, 1935 now Patent No. 2,108,748 granted Feb. 15, 1938.

Having thus described our invention, what we claim as new and desire to secure by Letters Patent, is:

1. Method of producing a lead acid storage battery electrode which comprises introducing active material into the interstices of the grid, introducing into the active material a solution of phenol and forming the electrode in a solution of dilute sulphuric acid and formaldehyde.

2. Method of producing a bonding network for active material in a lead acid storage battery electrode which comprises treating the pasted grid with a solution of phenol and forming the electrode in a solution of dilute sulphuric acid and formaldehyde.

3. Method of preparing a lead acid storage battery electrode which comprises adding 60.5 grams of 88% phenol to each liter of solution desired and immersing the unformed electrode in the solution, removing the electrode and immersing in a solution of sulphuric acid and formaldehyde equal to 42.3 grams of 40% formaldehyde equal to each liter of solution.

4. A lead acid storage battery electrode the paste ingredients of which have been treated with a solution of phenol and a subsequent treatment with dilute sulphuric acid and formaldehyde to produce on formation the bonding network.

5. A lead acid storage battery electrode comprising as ingredients one or more oxides of lead selected from the group consisting of litharge, red lead, lead sulphate, and lead suboxide, which has been treated with a liquid solution of phenol and then with dilute sulphuric acid and formaldehyde to form a bonding network.

6. A lead acid storage battery electrode characterized by the presence of a bonding network produced in situ by treating the active ingredients with a solution of phenol and forming the electrode in a solution of dilute sulphuric acid and formaldehyde.

HAROLD R. HARNER.
FREDERICK H. SCHULTZ.
EVERETT J. RITCHIE.